United States Patent
Mistrot et al.

(10) Patent No.: US 9,758,133 B2
(45) Date of Patent: Sep. 12, 2017

(54) VEHICLE LIFTING AND PARALLEL PARKING AID

(71) Applicant: Innovative Inventions, LLC, Port St. Lucie, FL (US)

(72) Inventors: Don A. Mistrot, Elberta, AL (US); Richard P. Duffield, Port St. Lucie, FL (US)

(73) Assignee: Innovative Inventions, LLC, Port St. Lucie, FL (US)

( * ) Notice: Subject to any disclaimer, the term of this patent is extended or adjusted under 35 U.S.C. 154(b) by 97 days.

(21) Appl. No.: 14/615,312

(22) Filed: Feb. 5, 2015

(65) Prior Publication Data

US 2015/0217732 A1    Aug. 6, 2015

Related U.S. Application Data

(60) Provisional application No. 61/936,224, filed on Feb. 5, 2014.

(51) Int. Cl.
  *B60S 9/14* (2006.01)
  *B60S 9/215* (2006.01)
  *B60C 23/00* (2006.01)

(52) U.S. Cl.
  CPC ............ *B60S 9/215* (2013.01); *B60C 23/006* (2013.01); *B60S 9/14* (2013.01)

(58) Field of Classification Search
  CPC .... B60S 9/215; B60S 9/14; B60S 9/21; B60S 9/205
  See application file for complete search history.

(56) References Cited

U.S. PATENT DOCUMENTS

| | | | |
|---|---|---|---|
| 270,573 A | 1/1883 | Blake | |
| 1,118,611 A | 11/1914 | Wise | |
| 1,118,033 A | 6/1916 | Bihler | |
| 1,279,500 A | 9/1918 | Berry | |
| 1,307,600 A | 6/1919 | Rose et al. | |
| 1,340,024 A | 5/1920 | Davis et al. | |
| 1,400,931 A | 12/1921 | Barker | |
| 1,473,369 A * | 11/1923 | Williams | B60S 9/21 180/200 |
| 1,482,954 A | 2/1924 | Tideman | |
| 1,560,460 A | 11/1925 | Yates et al. | |

(Continued)

FOREIGN PATENT DOCUMENTS

| CN | 101875371 | 11/2010 |
|---|---|---|
| FR | 1136229 | 5/1957 |

(Continued)

*Primary Examiner* — Tony Winner
*Assistant Examiner* — Michael Stabley
(74) *Attorney, Agent, or Firm* — McHale & Slavin, P.A.

(57) ABSTRACT

A vehicle lifting and parking aid system having sidewinder wheel units mounted on the axles between the brakes and the spindle of each wheel of a vehicle controlled from a control module located within the vehicle is disclosed. In the deployed position, each sidewinder unit is against the ground surface and lifts the vehicle approximately 0.5" off the ground. Using joysticks on a control module located within the vehicle, the user is able to operate, i.e. direct, the sidewinders to the left or right at different variations in speed whereby the vehicle is moved to the left or right by way of a rotating gear train.

21 Claims, 12 Drawing Sheets

(56) References Cited

U.S. PATENT DOCUMENTS

| | | | |
|---|---|---|---|
| 1,639,054 A * | 8/1927 | Palmer | B60S 9/21 180/200 |
| 1,650,031 A | 11/1927 | Nash | |
| 1,681,665 A | 8/1928 | Haynes | |
| 1,764,486 A * | 6/1930 | Woolley | B60S 9/14 180/200 |
| 2,330,894 A | 10/1943 | Jezler | |
| 2,358,592 A | 9/1944 | Quinn | |
| 2,416,838 A * | 3/1947 | Miller | B60S 9/14 180/200 |
| 2,619,319 A | 11/1952 | Lucas | |
| 2,638,995 A * | 5/1953 | Gottlieb | B60S 9/21 137/383 |
| 2,692,143 A * | 10/1954 | Rando | B60S 9/215 105/177 |
| 2,764,249 A | 9/1956 | Paolucci | |
| 3,029,886 A * | 4/1962 | Hansen | B60S 9/21 180/200 |
| 3,120,398 A * | 2/1964 | Butterworth | B60S 9/20 180/199 |
| 3,186,686 A | 6/1965 | Mayer | |
| 3,240,287 A * | 3/1966 | Lepore | B60S 9/215 180/202 |
| 3,266,587 A * | 8/1966 | Roberts | B60S 9/215 180/200 |
| 3,623,562 A * | 11/1971 | Pitra | B60S 9/14 180/200 |
| 3,826,322 A | 7/1974 | Williams | |
| 4,030,701 A | 6/1977 | Pingon | |
| 4,067,543 A | 1/1978 | Orth et al. | |
| 4,295,635 A | 10/1981 | Pustka et al. | |
| 4,350,470 A | 9/1982 | Murillo | |
| 4,465,421 A | 8/1984 | Murillo | |
| 4,542,882 A | 9/1985 | Choe | |
| 4,605,086 A * | 8/1986 | Marom | B60S 9/215 180/202 |
| 4,629,388 A | 12/1986 | Riemer et al. | |
| 4,645,181 A | 2/1987 | Schapansky | |
| 4,834,206 A | 5/1989 | Ching-Tang | |
| 4,948,107 A | 8/1990 | Orndorff, Jr. | |
| 4,993,688 A | 2/1991 | Mueller et al. | |
| 5,039,123 A | 8/1991 | Smeitink | |
| 5,151,004 A * | 9/1992 | Johnson | B64F 1/22 180/209 |
| 5,232,206 A | 8/1993 | Hunt et al. | |
| 5,377,957 A | 1/1995 | Mosley | |
| 5,419,580 A * | 5/1995 | Ku | B60S 9/18 180/199 |
| 5,451,080 A | 9/1995 | Kneile | |
| 5,465,940 A | 11/1995 | Guzman | |
| 5,738,376 A | 4/1998 | Marom | |
| 5,765,810 A | 6/1998 | Mattera | |
| 5,868,600 A * | 2/1999 | Watanabe | A63H 17/36 180/200 |
| 5,884,720 A | 3/1999 | Ackerman | |
| 5,893,571 A | 4/1999 | Nowell | |
| 6,213,491 B1 | 4/2001 | Southard, Jr. | |
| 6,527,254 B1 | 3/2003 | Prevete | |
| 6,843,487 B1 | 1/2005 | Lotman | |
| 6,895,648 B1 | 5/2005 | Willett | |
| 6,913,248 B1 | 7/2005 | Schmitz | |
| 7,921,952 B2 | 4/2011 | Tseng et al. | |
| 8,424,848 B1 | 4/2013 | Hawkins, Jr. | |
| 8,489,283 B2 | 7/2013 | Widmann | |
| 2010/0080679 A1 | 4/2010 | Stebbins, Jr. | |

FOREIGN PATENT DOCUMENTS

| | | |
|---|---|---|
| FR | 2724617 | 3/1996 |
| FR | 2841517 | 1/2004 |
| FR | 2916400 | 11/2008 |

* cited by examiner

VEHICLE LIFTING AND PARALLEL PARKING AID

PRIORITY CLAIM

In accordance with 37 C.F.R. 1.76, a claim of priority is included in an Application Data Sheet filed concurrently herewith. Accordingly, the present invention application claims priority to U.S. Provisional Application No. 61/936,224, entitled "Vehicle Lifting and Parallel Parking Aid" filed Feb. 5, 2014, the contents of which are incorporated herein in their entirety.

FIELD OF THE INVENTION

This invention relates generally to the field of automotive accessories, and in particular to a vehicle lifting and parallel parking aid.

BACKGROUND OF THE INVENTION

Parallel parking, considered to be one of the most challenging maneuvers for new drivers to learn, is a method of parking a vehicle in line with other parked vehicles. Parallel parking requires driving the vehicle slightly past the parking space, parallel to the vehicle parked in front of that space and then, while maintaining a safe distance, reversing into the chosen space. Subsequent position adjustment may require the use of forward and reverse gears. Reversing into the spot via the parallel parking technique allows one to take advantage of a single empty space not much longer than the car (typically one and a half car-lengths long). Parallel parking allows a vehicle to park in a smaller space than with side-by-side parking, which is common in many public parking facilities, but often equally as challenging because of the action of other drivers.

Archaic methods of using lifting devices to assist in parallel parking are known. U.S. Pat. No. 3,186,686 describes a jacking system for vehicles operated by power from the engine and controlled from the dashboard of the vehicle. A method of using the system for parking the vehicle in restricted space is described as follows: the driver locates the vehicle directly beside the empty parking space, lets the rear right jack down to the ground to lift the vehicle so the rear right wheel is off the ground, then lets the two front jacks down on the ground to lift the wheels slightly off the ground, and then turns the steering wheel to the full right lock; the two front jacks are then retracted, whereafter the vehicle is put into reverse gear and slowly driven backwards until the vehicle, which is rotating on the rear right jack, stands crosswise to the parking space (thus the rear portion of the vehicle is in the parking space and the front end portion of the vehicle remains in the road); then the rear right jack is retracted, and the vehicle is reversed a couple feet; then the rear left jack, along with the front two jacks, is extended and the steering wheel is turned fully to left lock, the front jacks are retracted and the vehicle is driven slowly in reverse gear until rotating on the rear left jack, and the vehicle is swung into the parking space.

Generally, in order to have parallel parking for a vehicle, parking system aids require the use of highly sophisticated technology combining computer programs with cameras plus electro-hydraulic system controlling driving wheels. Such a system must be built into the vehicle during manufacturing, thereby increasing the cost of the vehicle. More specifically, U.S. Pat. No. 8,489,283 discloses an autonomous parallel parking system that requires the use of multiple distance sensors strategically located at various locations around a host vehicle body structure, such as front side fascia, rear-side fascia, a front bumper, and a rear bumper. These sensors can collectively measure various displacements between the host vehicle and adjacent parked vehicles. The controller touch-down can use these various displacement measurements to implement algorithms to establish a "steer" angle for the host vehicle in order to allow it to be backed into the parking space while avoiding impact with adjacent parked vehicles. These parallel-parking systems can be expensive due to the cost of the multiple sensors and the controller touch-down that processes the algorithms. In addition, the system implementation requires the additional cost of controllable steering (i.e. electric power steering), controllable brakes, and controllable throttles.

The car accessory industry has grown tremendously through the years. The establishment of the patents and methods of use above have had a significant influence on the various automotive outlets, websites, and body shops dedicated to marketing their services by selling car accessory parts and implements for installation of lifting and lowering of vehicles. While off-road trucks, low-riders and trick cars may seem to corner the market on lifting and lowering vehicles, some drivers merely want to lower or lift their vehicle for the sake of appearance, improved daily performance, or in case of emergency.

Cars and trucks need flexibility for handling on varied road conditions and to be able to withstand the rigors of stopping and turning. Springs that come from vehicle manufacturers at pre-set heights are positioned between the wheels and the frame to function as part of a suspension system that enables the vehicle to move comfortably and safely. Lowering a car by adjusting the spring height or placement is a popular and relatively common practice. Drop springs sold by auto parts suppliers can replace existing factory springs. Some car owners choose to cut the manufacturers' coil suspension springs instead, but this method can cause the springs to weaken and even fail, resulting in an uneven or dangerous ride. This practice can eventually cost more because it may throw off a car's alignment, resulting in wear and tear on supporting parts like the frame, tires and undercarriage.

Overall, the lifting and lowering of a vehicle can be very expensive, especially for the vehicle owner not interested in the aesthetic or functional appeal of an off-road truck, low-rider, or trick car. However, providing a lifting and lowering system to perform mechanical services, such as tire, brake, or axle repair, parts replacement, or maintenance in an emergency should not be ignored because of financial or manufacturer restrictions.

In emergency situations, car lifting is done by using a manual lift or an electrical lift. Vehicle jack devices devised and utilized of familiar structural configurations are known in the prior art.

U.S. Pat. No. 1,118,611 discloses a runner for use with vehicles in emergency situations comprised of a frame having a pair of caster wheels attached to a vehicle axle. In the event one or more vehicle wheels, spindles, or other parts become disabled, the runner is constructed so as to be easily and quickly substituted for a disabled or broken wheel to enable the vehicle to be moved to safety. The drawbacks associated therewith are that the runner is limited in distance the vehicle can be moved; and when moved, the frame can become dismounted from the chassis because of the load placed upon it.

U.S. Pat. No. 270,573 discloses auxiliary wheels that come into operation when an axle or spring breaks, as well as when severe shocks take place while driving on uneven roads. The drawbacks associated therewith include an uneven drive created during emergency situations and, since the auxiliary wheels do not elevate the chassis sufficiently, there is a limited clearance should a tire explode.

U.S. Pat. No. 1,279,500 discloses a fluid based operated jack having a fluid controlled extendable member, a pump for forcing fluid for operation of the extendable member, a multiple position valve, and pumps, whereby the jack is suspended from an automobile chassis and, upon operation of the extendable member, swings to a horizontal support position. U.S. Pat. Nos. 2,619,319 and 2,764,249 disclose hydraulic jack systems whereby different portions of the vehicle can be selectively or simultaneously elevated.

U.S. Pat. No. 4,067,543 discloses an electrically operated retractable jack, which is automatically retractable from a vertical position into a horizontal storage position under the vehicle. U.S. Pat. No. 5,377,957 discloses the same, and includes a hydraulic positioning assembly to extend the jack from a storage position to an operational position. U.S. Pat. Nos. 5,765,810 and 6,895,648 include an air compressor, a control panel electrically coupled to the air compressor, and a plurality of air jacks secured to the vehicle and connected to the air compressor by tubing for automatic or manual elevation of the vehicle. U.S. Pat. No. 4,993,688 discloses the same, but is comprised of two pneumatic jacks, one mounted centrally to the front suspension and a second mounted centrally to the rear suspension.

The jacking systems above fulfill their respective objectives; however, none of the lifting systems described above address the safety issue of removing the vehicle from harms way in the event of an emergency on a busy road. What is lacking is a system that will allow one to move their disabled vehicle to a safe area (without risking further damage to the vehicle) and provide a lifting system for assisting in making repairs. The lifting and parking system should rotate about the vehicle's axle and/or spindles to reduce the amount of lift required to raise the vehicle's tires off the ground surface.

Thus, what is lacking in the art is an efficient, cost effective parking system that is capable of lifting a vehicle and assisting in the process of parallel parking.

SUMMARY OF THE INVENTION

A vehicle lifting and parking aid system having a sidewinder wheel unit mounted between the brakes and the spindle of each wheel of a vehicle controlled from a control module located within the vehicle is disclosed. Each sidewinder wheel unit is comprised of a touch-down wheel, sidewinder wheel, DC electric high torque motor, a positioning system (motor driven rotating gears and lift gears), and a solenoid operated locking pin. In general, the device rotates between a storage position and a deployed position. In the storage position, the device is positioned under the vehicle so that it does not impair normal operation of the vehicle. When deployed, the device rotates about the axle or spindle until a touch-down wheel, aligned with the longitudinal centerline of the vehicle, lifts the primary wheels of the vehicle about one half inch off of the ground surface. Thereafter, the device is locked into place by the solenoid operated locking pin. Once positioned and locked into the deployed position, the sidewinder wheel is positioned against the ground surface, lifting the touchdown wheel off the ground. The sidewinder wheel has its center of axis perpendicular to the ground surface and transverse with respect to the longitudinal axis of the vehicle, whereby rotation thereof moves the vehicle to the left or right. By way of the second solenoid, the motor switches from operating the lifting gear train to the rotating gear train. Using joysticks on the control module located within the vehicle, the user is capable of initiating rotation of the sidewinders about a vertical axis. This construction permits the operator to move the vehicle in any direction along a surface. Accordingly, it is a primary objective of the instant invention to provide a vehicle lifting and parking aid system that allows vehicles to be moved sideways without turning the vehicle's wheels or altering the power train or design.

It is a further objective of the instant invention to provide a vehicle lifting and parking aid system that aids in parallel parking within a space of equal length of the vehicle, as opposed to the typical one and half car-length long space without the use of expensive sensors, and capable of parallel parking.

It is yet another objective of the instant invention to provide a vehicle lifting and parking aid system that will stop the vehicle from going out of control when a tire blow-out occurs, since the touch-down wheel immediately makes contact with the road and functions in place of the blown out tire until the vehicle is driven to an area of safety.

It is a further objective of the instant invention to provide a vehicle lifting and parking aid system that, while in an engaged position, allows one to change tires, brakes, axles, or the like without the use of a jack or expensive lifting and lowering system.

It is a still further objective of the instant invention to provide a vehicle lifting and parking aid system capable of making a complete 360-degree turn in any direction.

It is an additional objective of the instant invention to provide a vehicle lifting and parking aid system that does not move or extend the suspension system while lifting the vehicle.

It is yet still another objective of the instant invention to provide a vehicle lifting and parking aid system that will enable the vehicle to be moved safely.

It is yet another additional objective of the instant invention to provide a vehicle lifting and parking aid system that will move a vehicle from a cramped space under battery power.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
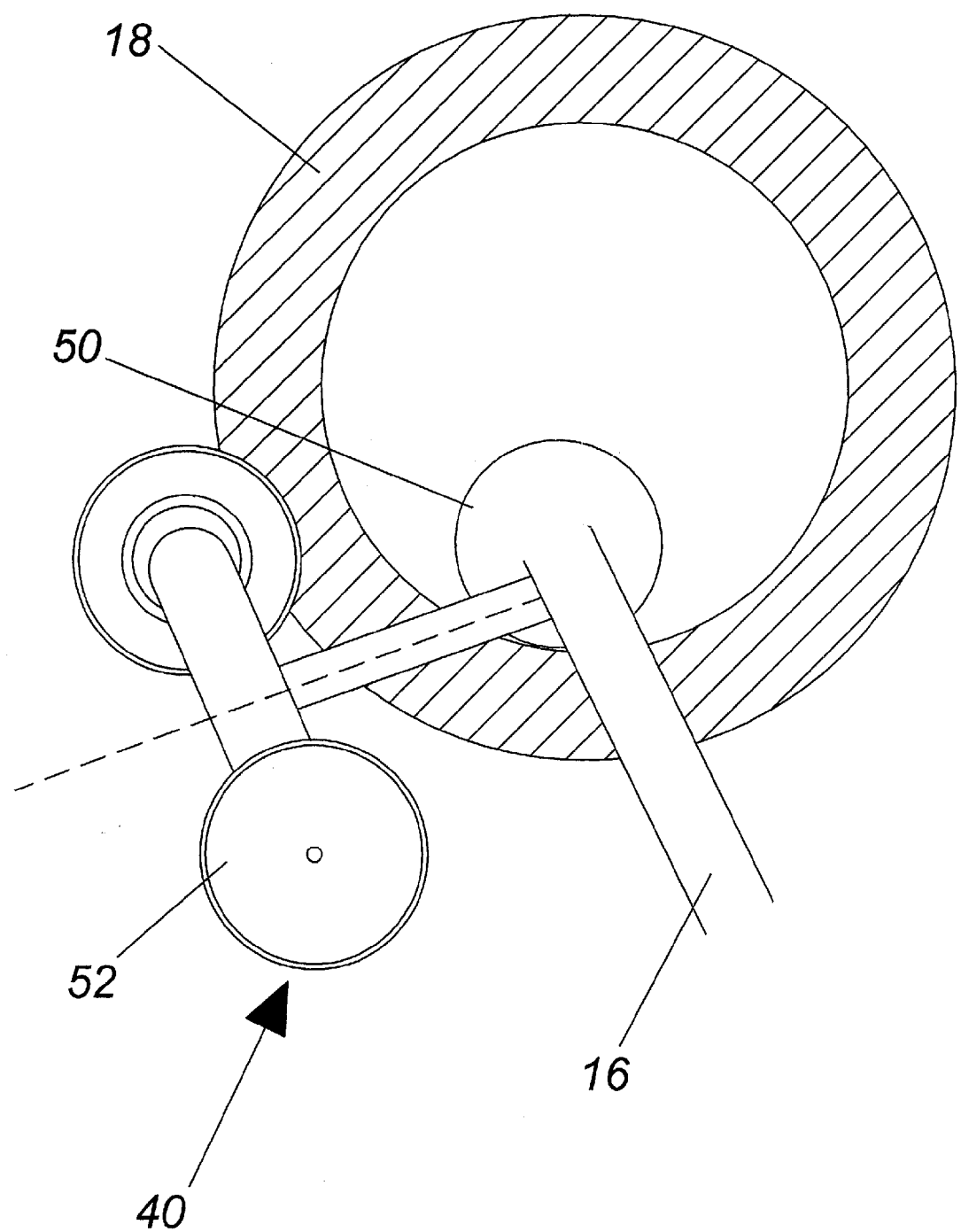
FIG. 1 is a perspective view of the sidewinder unit of the instant invention in a retracted position.

As shown in FIGS. 1-11, each sidewinder unit 40 includes a sidewinder wheel 52, a touch-down wheel 50, a high torque electric DC motor 3 which may include a gear drive 4, a first solenoid 72 for locking in the retracted and engaged positions of the sidewinder unit, and a second solenoid 74 to move the high torque electric DC motor 3 between the gearing system (from a lifting gear train to a rotating gear train). The four sidewinder units 40 are contemplated to weigh no more than 250 to 300 lbs. depending on the size and demands of each vehicle. The sidewinder unit is powered by external batteries 60, 62 (FIGS. 4 and 5), and coupled to a control module 100 (FIG. 6) located inside of the vehicle. It is contemplated that the external batteries 60, 62 be stored in the trunk of the vehicle. Each sidewinder unit 40 contains its own gearing systems 4, 5. The gearing system is comprised of motor driven rotating gears 4 and lifting gears 5 (don't see on a FIG). The motor driven rotating gears 4 are coupled to the sidewinder wheels 52 to create rotation of the wheels which are perpendicular to the ground and transverse with respect to the longitudinal centerline of the vehicle. The lift gears 5 are coupled to the sidewinder unit 40 and the axle 16 or spindle of the vehicle so as to rotate the sidewinder unit around the axis of rotation of the respective vehicle wheel, e.g. axle or spindle, between a retracted position, tucked under the vehicle, and an engaged position, engaging the ground surface. In the engaged position, the touchdown wheel 50 initially contacts the ground surface and lifts the vehicle approximately 0.5" off the ground. Thereafter, the sidewinder wheel 52 contacts the ground, lifting the touchdown wheel 50 to allow traversal of the vehicle with the sidewinder wheel 52. In the engaged position, the sidewinder has its longitudinal axis 78 arranged substantially perpendicular to the ground surface. In at least one embodiment, the sidewinder unit 40 is rotatable about the longitudinal axis 78 to allow the user to drive the vehicle in any direction with the sidewinder units 40. This construction also allows the user to rotate the vehicle in position for turning the vehicle around in tight areas by causing the sidewinder units on one end of the vehicle to drive in an opposite direction as the sidewinder units on the other end of the vehicle. In at least one embodiment, the touch-down wheel 50 functions as an emergency wheel in the case of a tire blowout. In this embodiment, the sidewinder unit 40 can be coupled to the vehicle's on-board computer which monitors tire pressure. When an under-inflated or rapidly deflating tire is detected, the sidewinder can be configured to automatically move to the deployed position on that corner of the vehicle, allowing the operator to drive safely to the side of the roadway or to the nearest repair station.

Referring to FIGS. 1, 2 and 7-11, the front and rear sidewinder units 40 are rotatably secured onto the axle 16 or spindle for movement between the retracted and deployed positions. This construction allows the vehicle to be lifted off the ground without extending the vehicle suspension. This provides a significant advantage over other known lifting devices by reducing the distance the lifting device must travel to raise the vehicle. It also saves significant wear and tear on the vehicle suspension by not hanging the vehicle suspension on the shocks of the vehicle. The sidewinder system also provides an advantage by allowing each sidewinder unit 40 to be moved independently with respect to each other. This construction permits the sidewinder units to be mounted under the vehicle to be stored in front of or behind the respective axle as desired, adding versatility to the system. In the preferred embodiment, the front sidewinder units 40 are stored in a retracted position facing the back end of the vehicle, while the rear sidewinder units 40 are stored in a retracted position facing the front side of the vehicle. Thus, the sidewinder wheels are facing each other (towards the center of the vehicle) when in a retracted position. When the sidewinder unit is activated, the front sidewinder units 40 rotate downwardly away from the rear of the vehicle, and the rear sidewinder units 40 rotate downwardly away from the front of the vehicle. By moving the front and rear sidewinder wheels in opposite directions, there is very little movement felt in the lifting of the vehicle. Thus, a substantially equal force is exerted against the ground when the front and rear sidewinder units are engaged.

Figure 2:
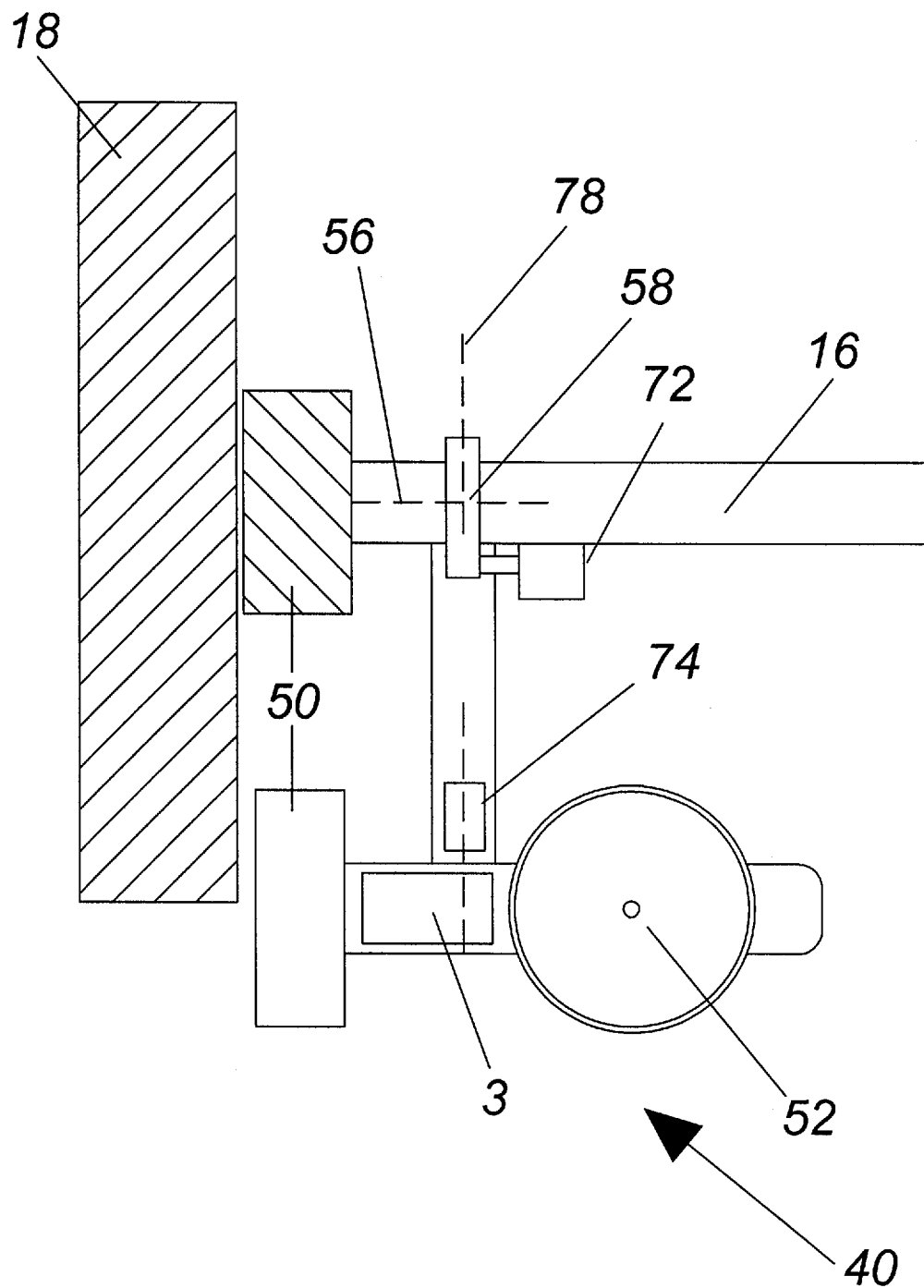
FIG. 2 is a side view of the sidewinder unit of the instant invention in an engaged position.
Figure 3:
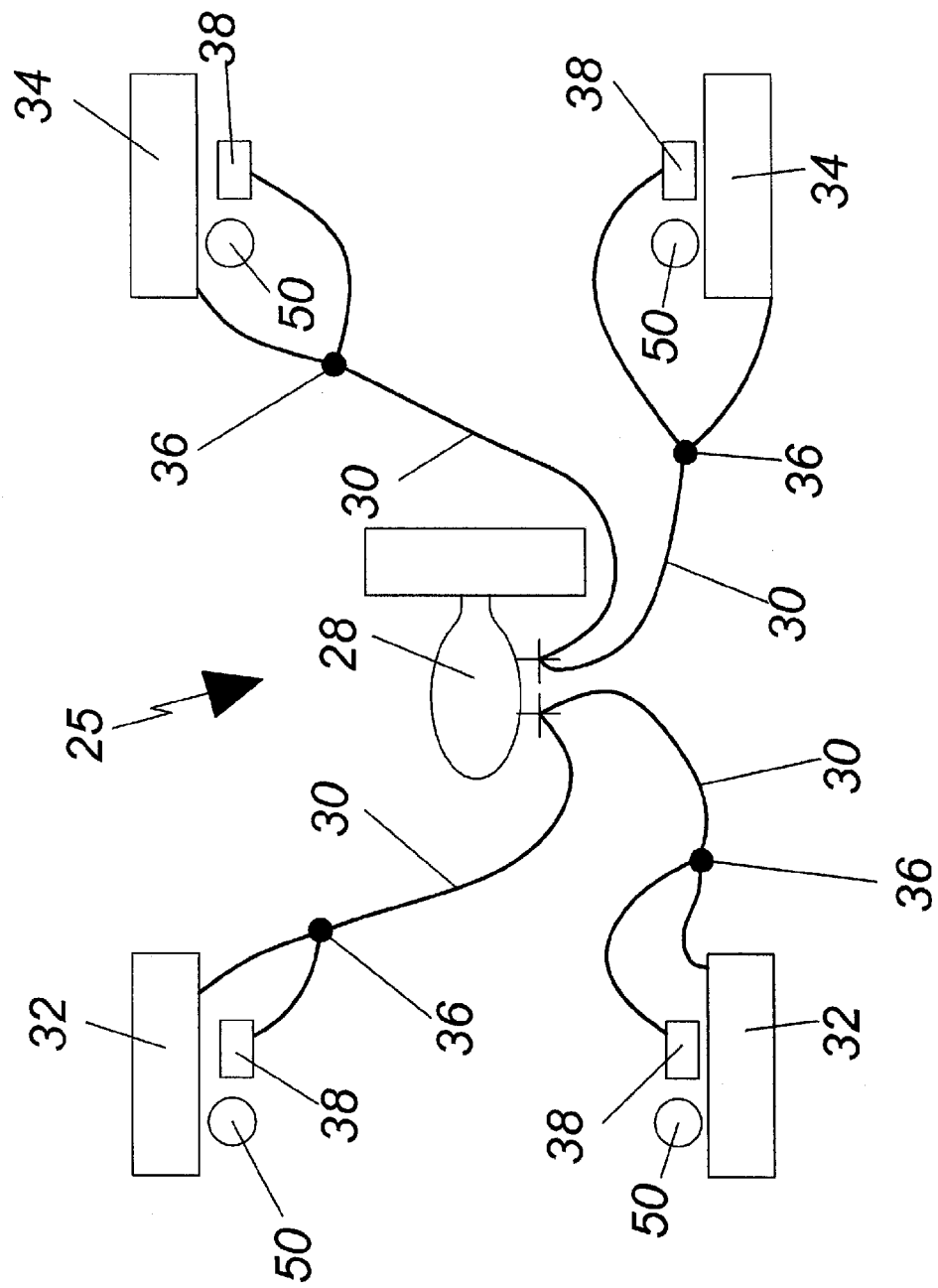
FIG. 3 is a schematic representation of the hydraulic brake system of the instant invention.

Referring to FIGS. 1-3, and 7-11, the touch-down wheels 50 are mounted on the sidewinder unit 40 to initially touch down next to each existing vehicle wheel 18 as shown in FIGS. 1, 2 and 7-11. The touch-down wheel 50 is preferably constructed to include a solid center section 6 with suitable bearings 7 for high speed operation, while the outer portion 8 of the touchdown wheel 50 includes a suitable polymeric compound for approximately 100 miles of travel without significant damage. Additionally, as shown in FIG. 3, each sidewinder unit 40 is preferably equipped with a hydraulic braking system 25, connected to the touch-down wheel 50. In one embodiment, the hydraulic braking system is tapped off the vehicle's regular braking system (not shown). In this manner, if the driver were to depress on the brake pedal, it will also operate the brakes on each touch-down wheel 50. The existing vehicle master cylinder contains hydraulic brake lines 30 that attach to the brakes at each wheel 32, 34. A proportioning valve 36 is T-tapped along the existing hydraulic brake line 30 and attached to a touch-down wheel 50. The proportioning valve 36 controls the flow of brake fluid to each touch-down wheel to provide braking force. This allows the operator to control braking of the vehicle in a downhill situation.

The gearing systems 4, 5 are powered by the high torque electric DC motors 3, 9. Generally, the lift gears powered by the high torque electric DC motor 3 position the sidewinder wheel between a retracted position and an engaged position, or visa versa. Then, the rotating gears 4 are activated to create rotation of the sidewinder wheel 52 to traverse the vehicle perpendicular with respect to the longitudinal axis of the vehicle. The control module applies proper polarity to the joysticks, as the joysticks control the speed of rotation. The control module further reverses polarity to the high torque electric motor depending on the joystick operation, for instance, when the joysticks are moved rapidly.

The high torque electric DC motors 3 and 9 power the gearing system comprised of lifting gears 5 and motor driven rotating gears 4. The lifting gears 5 transition the sidewinder wheel from a retracted to an engaged position against the ground. Therein, a solenoid-operated locking pin locks the sidewinder wheel where it comes in contact with the ground. Alternatively, the lifting gear train may be constructed and arranged to prevent rotation of the assembly without operation of the electric motor 9. Such a gear train may include worm and worm gear arrangements arrangement or the like which prevent rotation without rotation of the worm gear by the electric motor. The motor driven rotating gears 4 are coupled to the sidewinder wheels 52 to create rotation of the sidewinder wheels, with the axis of rotation of the sidewinder being perpendicular to the ground.

Figure 6:
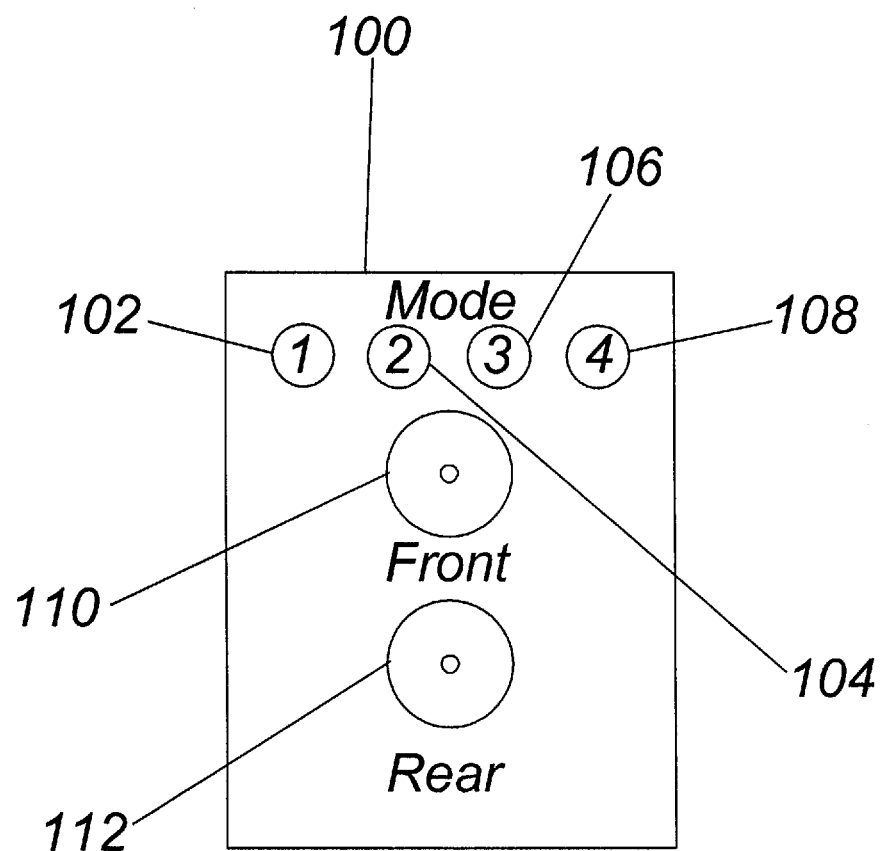
FIG. 6 is a top view of the control module of the instant invention.
Figure 7:
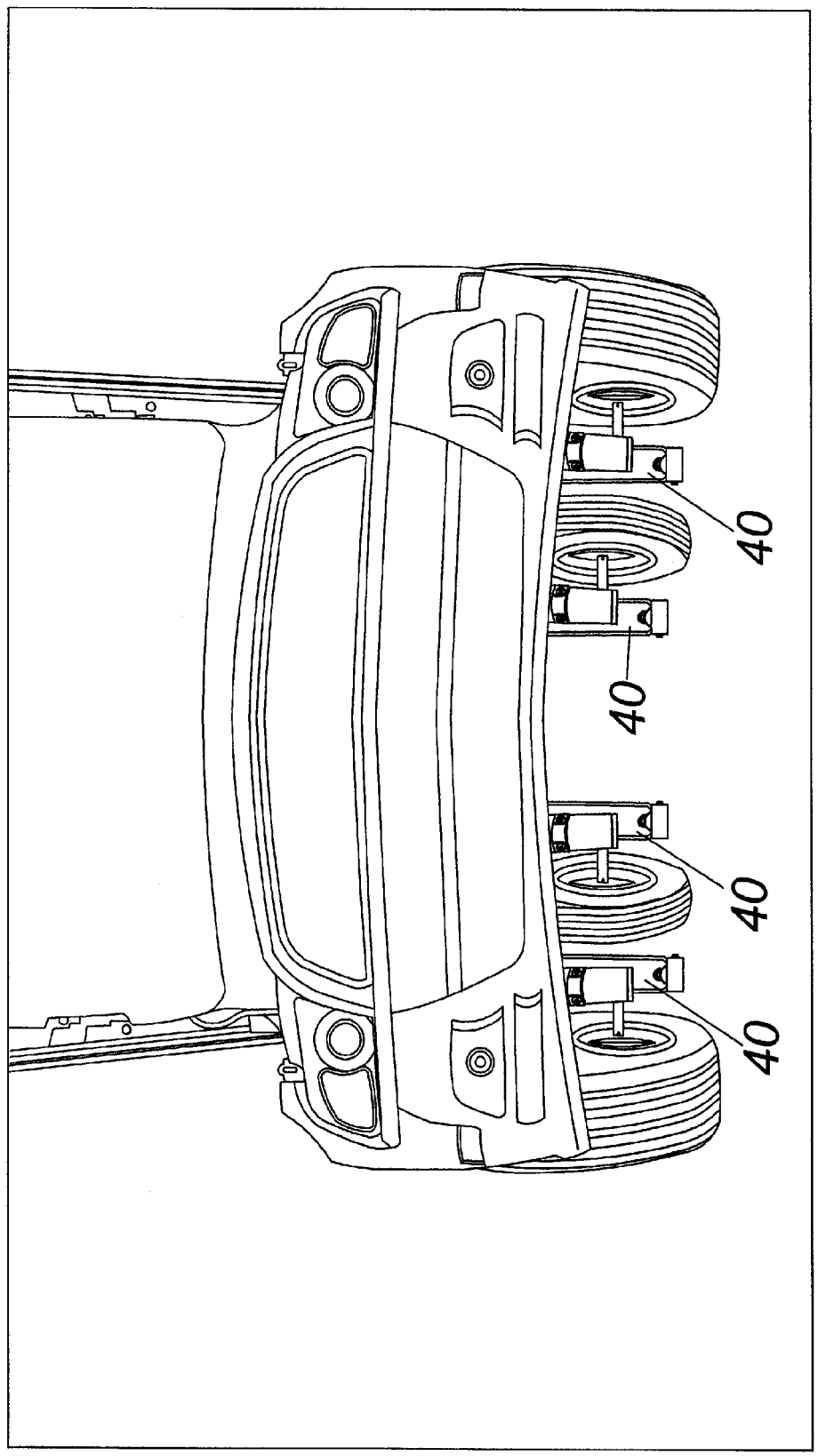
FIG. 7 is a front view of a vehicle on a lift illustrating the sidewinder units in a deployed position.
Figure 8:
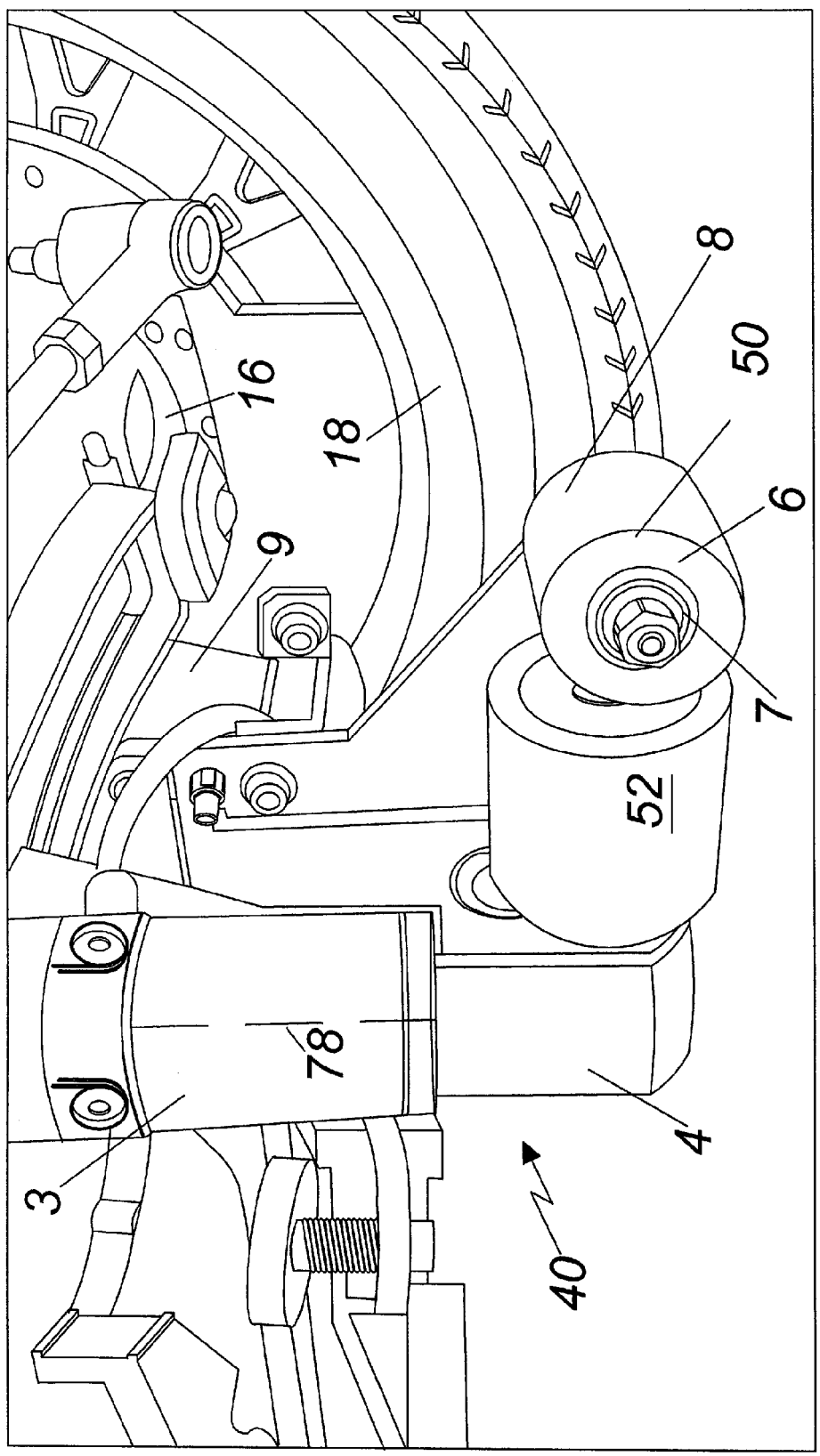
FIG. 8 is a partial isometric view illustrating a deployed sidewinder unit secured to the front suspension of a vehicle.
Figure 9:
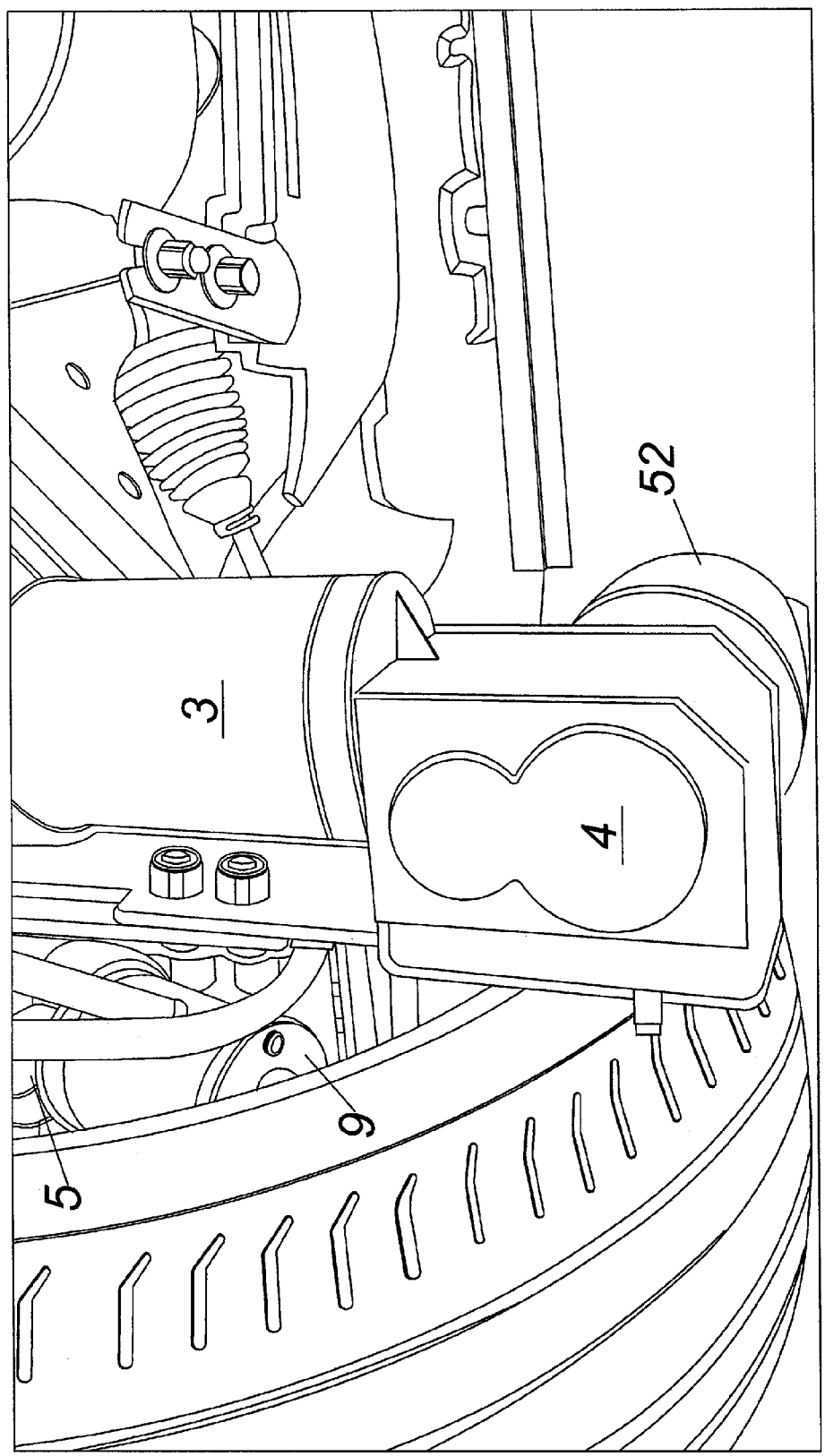
FIG. 9 is a partial rear isometric view illustrating a deployed sidewinder unit secured to the front suspension of a vehicle.
Figure 10:
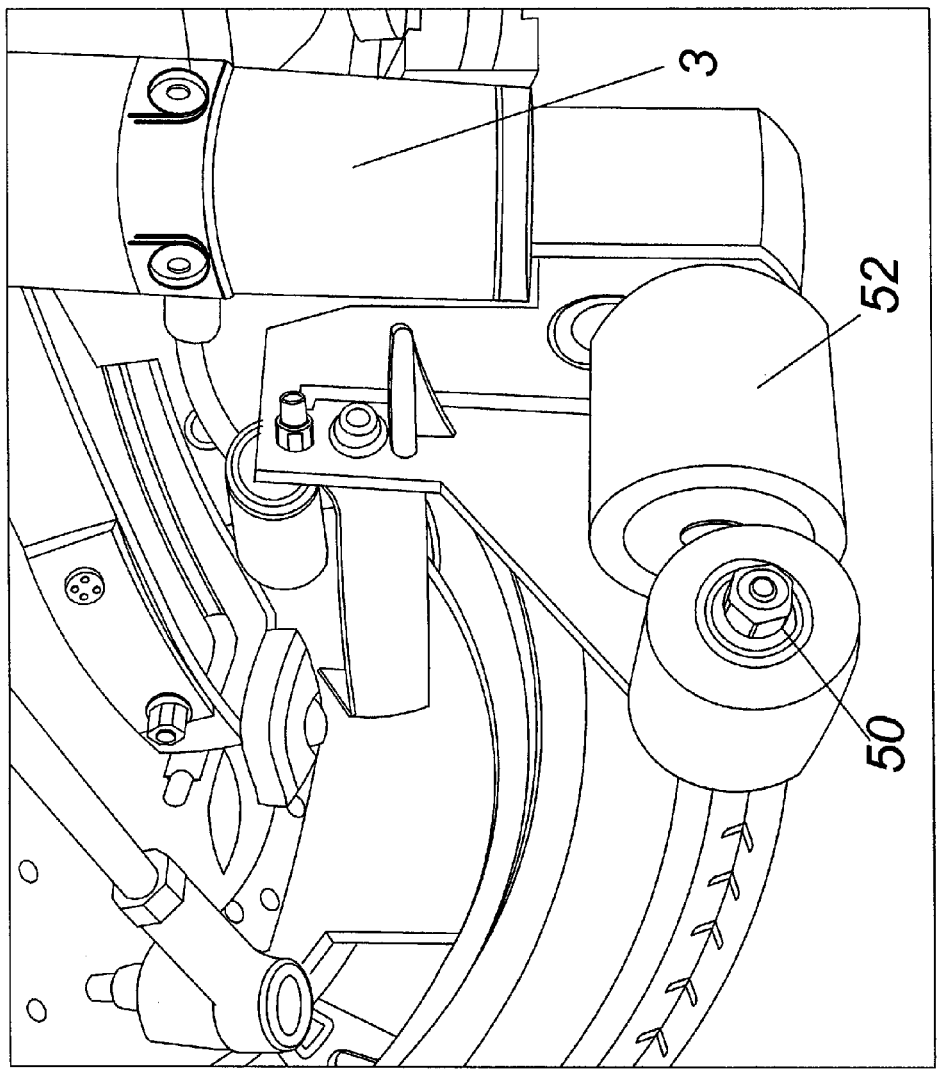
FIG. 10 is a partial front isometric view illustrating a deployed sidewinder unit secured to the front suspension of a vehicle.
Figure 11:
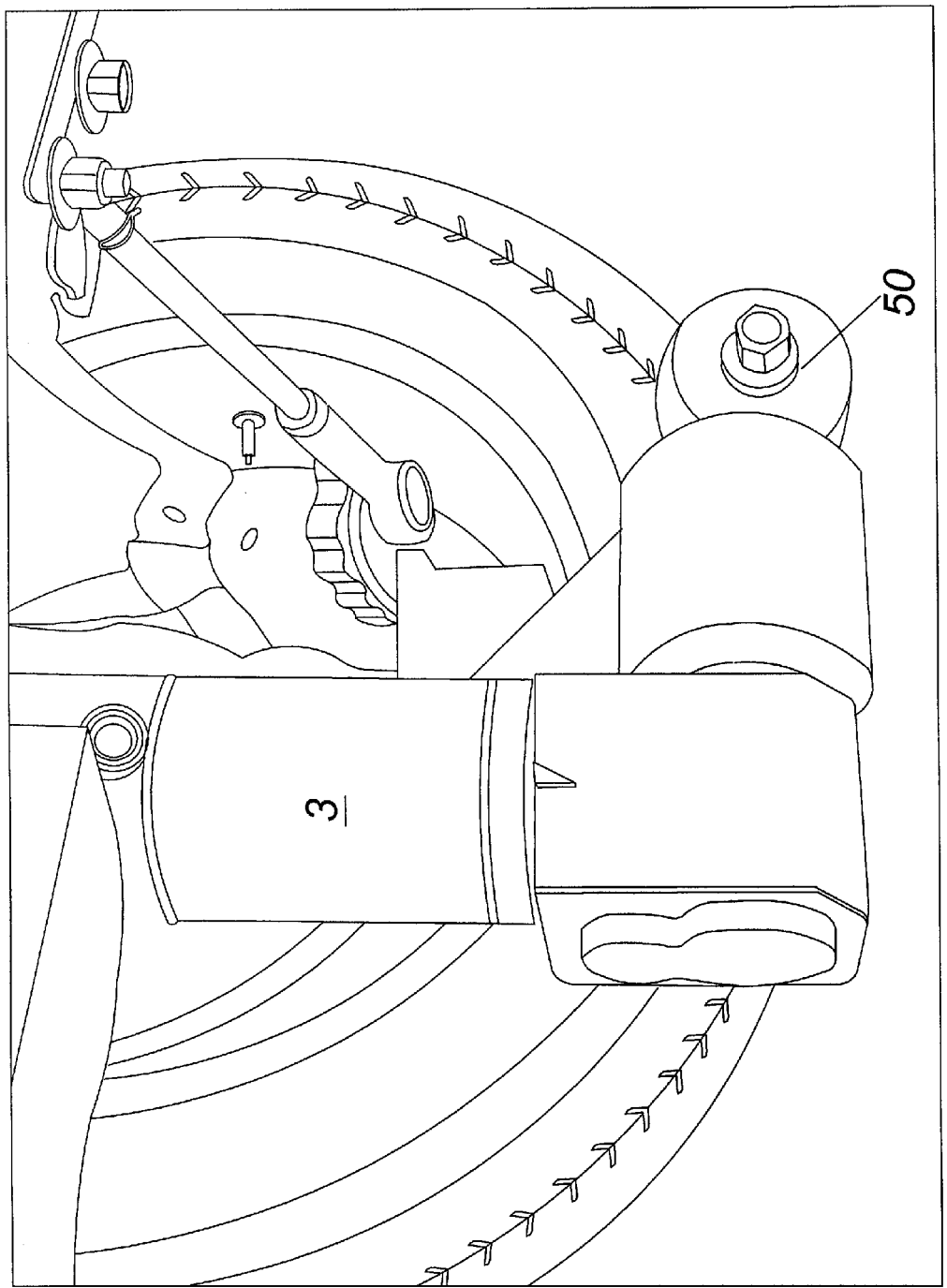
FIG. 11 is a partial rear isometric view illustrating a deployed sidewinder unit secured to the front suspension of a vehicle.
Figure 12:
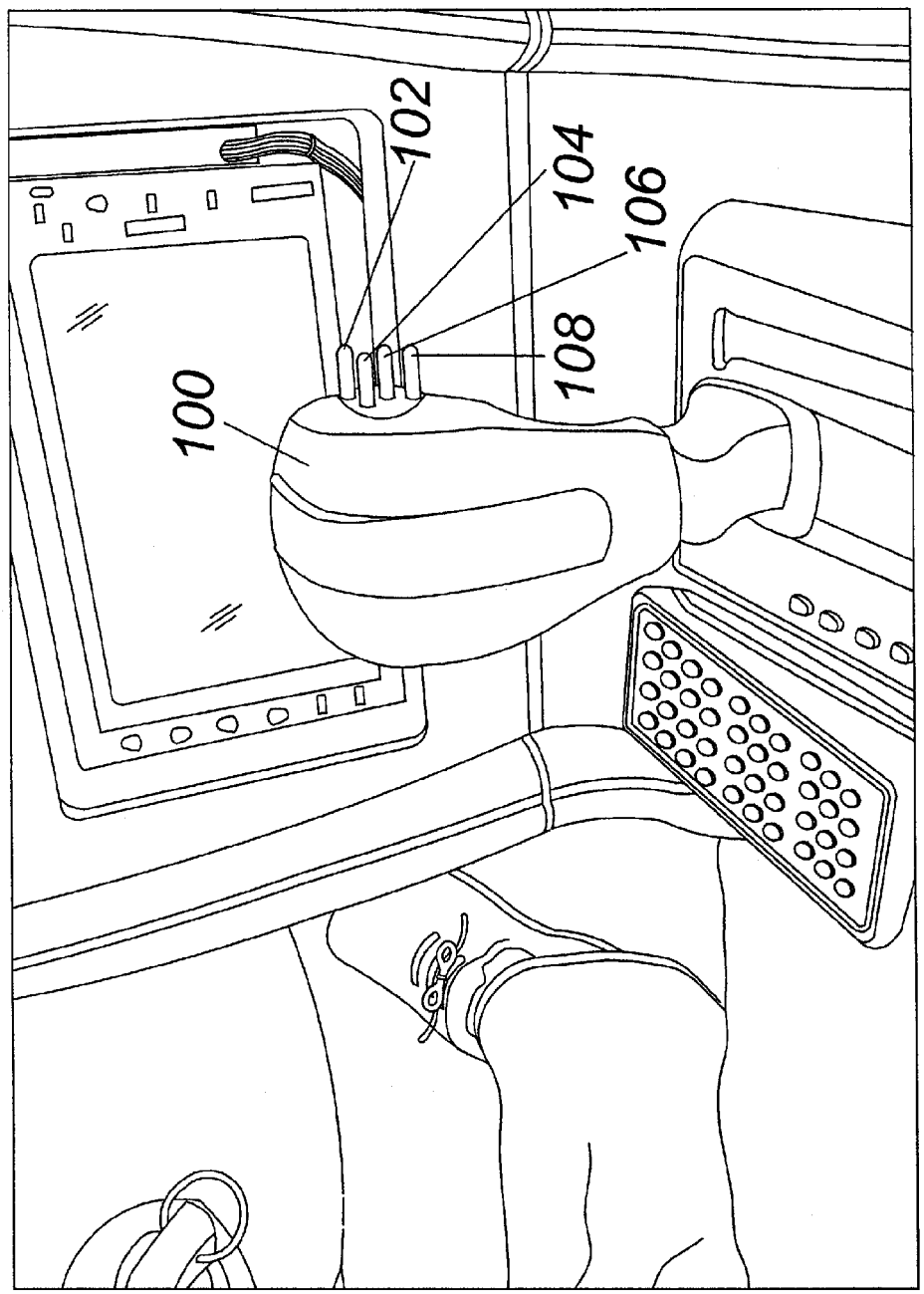
FIG. 12 is an isometric view of one embodiment of a controller for the sidewinder system.

Referring to FIG. 6, one embodiment of the control module 100 is illustrated. The control module 100 includes a pair of joysticks 110, 112 and four mode buttons 102, 104, 106 and 108. The first joystick 110 is configured for controlling the direction and speed of the sidewinder units 40 that are secured to the front of the vehicle, while the second joystick 112 is configured for controlling the direction and speed of the sidewinder units at the rear of the vehicle. Thus, sliding the front and rear joystick equally to the left will move the front and rear of the vehicle to the left at substantially the same speed, while sliding the front and rear joystick equally to the right will move the vehicle to the right at substantially the same speed. In order to make turns in place, the front joystick is moved in the opposite direction as the rear joystick. This results in the vehicle rotating about a point. The user may use any combination of point rotations and side shift movements to manipulate the vehicle as desired. Additionally, it is contemplated that the joysticks need not be in a control box, but may instead be placed within the steering column of the vehicle for ease of use. In at least one embodiment, the shifter mechanism in the column may include an extra position that deploys the sidewinder units. The joystick(s) may then be positioned on or near the shifter lever to allow operator manipulation of the sidewinder units 40. In at least one embodiment, (FIG. 12), the control module is positioned in the shifter of the vehicle. In this embodiment, the mode buttons 102, 104, 106 and 108 are positioned in the shifter knob for easy reach and operation by the user. In this embodiment, one or two joysticks can be used to cause operation of the motors once the sidewinders are deployed.

Figure 4:
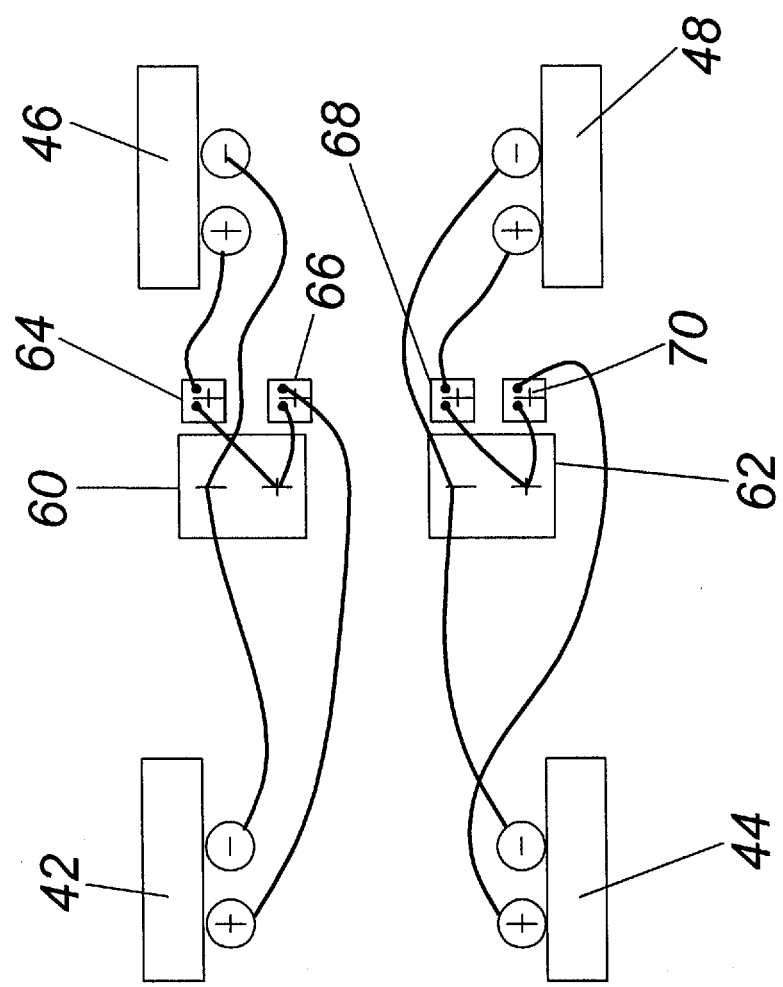
FIG. 4 is a schematic representation of the battery and thermal fuse lines of the instant invention.
Figure 5:
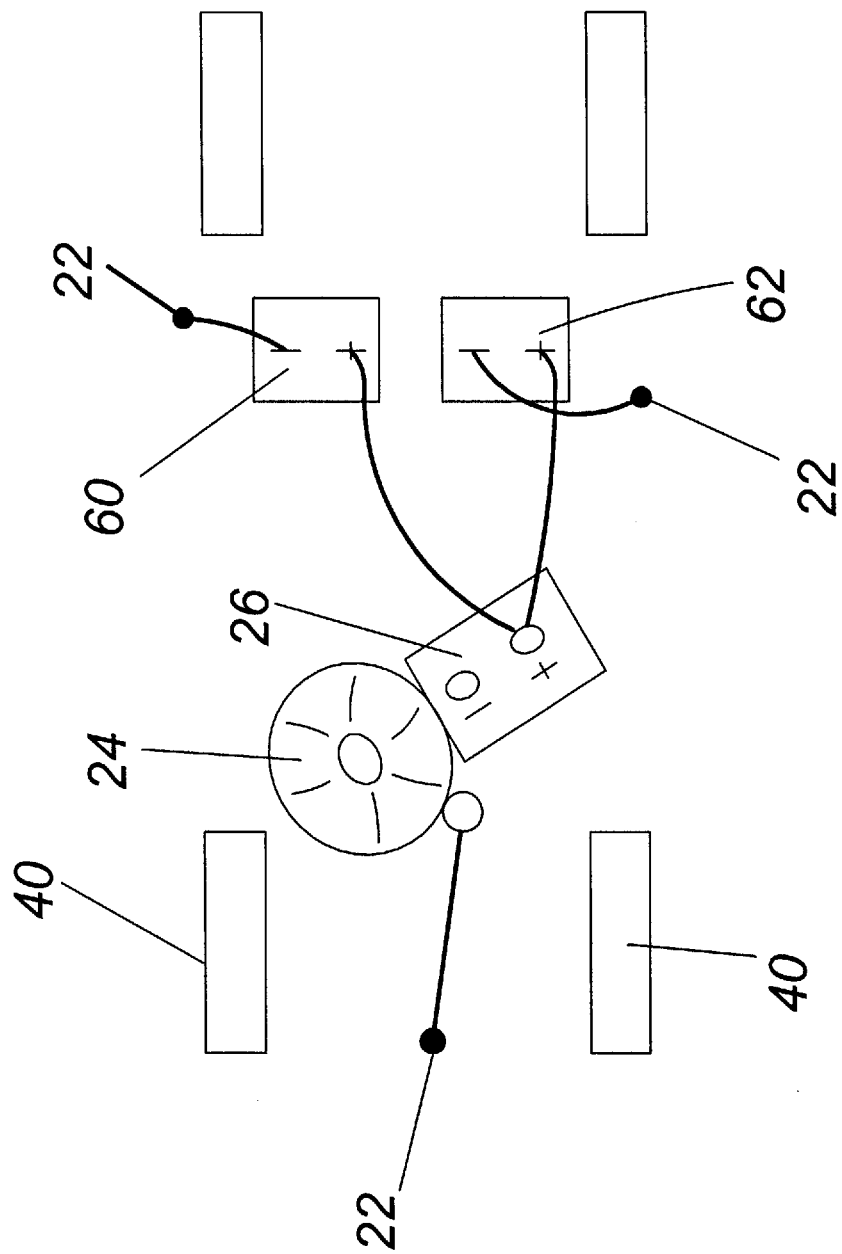
FIG. 5 is a schematic representation of the alternator system of the instant invention.

Referring to FIG. 4, the power schematic to the sidewinder units 40 is illustrated. In the preferred embodiment, batteries power the sidewinder units 40. In a particularly desirable embodiment, a first battery 60 is in electrical connection with the passenger side front and rear sidewinder units 40 and a second battery 62 is electrically connected to the driver's side front and rear sidewinder units 40. Each sidewinder unit is coupled to a respective thermal fuse, e.g. 64, 66 for the passenger side and 68, 70 for the driver's side. In this manner, should either battery be overloaded by any individual sidewinder, the thermal fuse will kick out to cut off the power from the respective battery to prevent damage to the sidewinder. Because each sidewinder is individually coupled to a thermal fuse, it does not affect any of the other sidewinders should one of the thermal fuses trip. Recharging of the batteries will preferably occur using the pre-existing vehicle alternator 24 and voltage regulator 26, as shown in FIG. 5.

As shown in FIGS. 1, 2, and 6, Mode 1 button 102 is activated upon placing the vehicle in park and depressing the button on the control module. Mode 1 activates the rotating lifting gears 5 and motor driven gears 4. Mode 1 engages the sidewinder wheels from a retracted to engaged position, thereby slightly lifting the vehicle off the ground, approximately 0.5 inch, and locking the sidewinder wheel into place by means of the solenoid locking pin 72. When going from a retracted position to an engaged position, the motor 9 is engaged in driving the lifting gears 5. The lifting gears 5 are coupled to the sidewinders 40 to create rotation of the sidewinders into a position that is substantially perpendicular to the ground surface. As the touchdown wheel 50 and subsequently the sidewinder wheel 52 touches down, force that is exerted against the wheel(s) is transmitted to the lifting gear 5 to place the sidewinder unit perpendicular to the ground. Once the sidewinder wheel has its axis of rotation parallel to the ground, the solenoid locking pin 72 then locks the sidewinder wheel in place. The motor 3 is then utilized for driving the motor gear 4 and thus the sidewinder wheel 52. The motor driven gears 4 are coupled to the sidewinder wheels 52 to create rotation along the ground surface causing the vehicle to move left or right. The user is then capable of operating the joysticks to cause the sidewinder wheels to rotate either direction to cause the vehicle to move left or right as needed. The speed of rotation of the sidewinder wheels 52 is user controlled and dependent upon the movement of one or more joysticks, buttons, knobs, touchscreens or the like.

Still referring to FIGS. 1, 2 and 6, the mode 2 button 104 is typically useful in repair, service, maintenance, and replacement situations. Mode 2 employs the lifting gears as well as the hydraulic braking system. Mode 2 also engages the lifting gears to transfer the sidewinder unit 40 from a retracted position to an engaged position, thereby slightly lifting the vehicle off the ground, approximately 0.5 inch, and locking the sidewinder unit into place via the solenoid locking pin 72. Once the vehicle is lifted and locked in place, one can perform services that are required when a vehicle is lifted, such as tire service, brake service, axle service, or the like. Furthermore, Mode 2 has an emergency operation function, which does not require depression of the button, but rather operates on a sensor. The sensor is connected to the existing tire pressure sensor. Should the sensor read a significant drop in tire pressure, the emergency operation function is activated, whereby the touch-down wheel 50 is provided as the secondary rotating wheel in place of the deflated or blown out tire, enabling the vehicle to be driven to a safe area. In this mode it should be noted that the sidewinder unit is not rotated to a position that is perpendicular to the ground surface but instead is a predetermined angle whereby the touchdown wheel 50 contacts the ground surface but the sidewinder wheel 52 does not. Thus, the angle is determined by the relative size of the touchdown wheel 50 with respect to the sidewinder wheel 52.

Still referring to FIGS. 1, 2 and 6, a description of operation in response to depression of the mode 3 button 106 will be described. Mode 3 is a function that will allow the sidewinder units to rotate and engage without the vehicle transmission being in park. Mode 3 is intended to be used by professionals and stunt drivers; however, it is contemplated that other uses for Mode 3 may transpire. For instance, during a vehicle stunt jump through the air, the stunt driver can engage the sidewinder unit 40 into the engaged position, just as in Mode 1. This would allow the vehicle to land in a sideways orientation without rolling over provided that the sidewinder wheel was allowed to roll freely.

Still referring to FIGS. 1, 2 and 6, a description of operation in response to depression of the mode 4 button 108 will be described. To disengage modes 1-3, mode 4 is provided. Mode 4 disengages the sidewinder wheels and retracts the sidewinder unit 40 into the retracted position.

Upon depression of the Mode 4 button, the first solenoid unlocks the locking pin 72 to allow the sidewinder unit 40 to retract, and then it activates the second solenoid that reverses the voltage to the sidewinder wheels lifting gears to position the sidewinder into the retracted position.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention, which are obvious to those skilled in the art, are intended to be within the scope of the following claims.

What is claimed is:

1. A vehicle lifting and parking aid comprising:
a plurality of sidewinder units, each said sidewinder unit secured to a vehicle to rotate about an axis of rotation of a wheel of said vehicle between a retracted position and a deployed position, said retracted position allowing normal operation of said vehicle wheel, said deployed position raising said wheel above a ground surface, each said sidewinder unit rotation controlled by a an operator of said vehicle, said deployed position providing controlled movement of said vehicle that is substantially perpendicular with respect to a longitudinal axis of said vehicle, whereby said wheels of said vehicle are raised above said ground surface without extending a suspension of said vehicle, each said sidewinder unit including a sidewinder wheel, said sidewinder wheel secured to said sidewinder unit to contact said ground surface while said sidewinder unit is in said deployed position, said sidewinder wheel having an axis of rotation, said axis of rotation being parallel said ground surface and parallel to said longitudinal axis of said vehicle, each said sidewinder unit including an electric motor for causing selective directional rotation of said sidewinder wheel, each said sidewinder unit includes a gear drive positioned between said electric motor and said sidewinder wheel, whereby said gear drive provides spacing between said electric motor and said sidewinder wheel, said gear drive is constructed and arranged to prevent rotation of said sidewinder wheel without operation of said electric motor, whereby said gear box provides a braking function to said sidewinder unit.

2. The vehicle lifting and parking aid of claim 1 wherein each said sidewinder unit includes a lifting motor for rotating said sidewinder unit between said retracted position and said deployed position.

3. The vehicle lifting and parking aid of claim 2 wherein said lifting motor includes a lifting gear, said lifting gear positioned and connected between said lifting motor and said vehicle.

4. The vehicle lifting and parking aid of claim 1 wherein each said sidewinder unit includes a touchdown wheel, said touchdown wheel positioned on said sidewinder to contact said ground surface before said sidewinder wheel, said touchdown wheel having an axis of rotation that is substantially perpendicular with respect to said sidewinder wheel and perpendicular with respect to said vehicles longitudinal axis.

5. The vehicle lifting and parking aid of claim 4 wherein each said touchdown wheel lifts said vehicle wheel approximately one half of one inch off the ground prior to allowing said sidewinder wheel to contact said ground surface.

6. The vehicle lifting and parking aid of claim 4 wherein one said sidewinder unit may be positioned at an angle which allows said vehicle to travel along its longitudinal centerline upon said touchdown wheel while the adjacently positioned wheel is raised above said ground surface.

7. The vehicle lifting and parking aid of claim 6 wherein said one sidewinder unit is electrically connected to a tire air pressure monitoring system, whereby said sidewinder unit is automatically deployed in response to a low pressure reading received from said tire air pressure monitoring system.

8. The vehicle lifting and parking aid of claim 7 wherein said tire air pressure monitoring system is electrically connected to an on board computer system for monitoring said tire air pressure, said sidewinder unit also being electrically connected to said on board computer, whereby said on board computer may automatically deploy said sidewinder unit.

9. The vehicle lifting and parking aid of claim 1 wherein each said sidewinder unit is rotatable about a longitudinal axis to allow the user to drive the vehicle in any direction with said sidewinder units.

10. The vehicle lifting and parking aid of claim 9 wherein each of said plurality of said sidewinder units is independently rotatable about said longitudinal axis.

11. The vehicle lifting and parking aid of claim 1 wherein one sidewinder unit is provided adjacent the interior of each innermost wheel of each axle of said vehicle.

12. The vehicle lifting and parking aid of claim 1 wherein a pair of front sidewinder units are stored in a retracted position facing the back end of said vehicle, while a pair of rear sidewinder units are stored in a retracted position facing the front side of said vehicle, whereby a substantially equal force is exerted against said ground surface when said front and said rear sidewinder units are deployed.

13. The vehicle lifting and parking aid of claim 1 wherein each said sidewinder unit is equipped with a hydraulic braking system.

14. The vehicle lifting and parking aid of claim 13 wherein said hydraulic braking system is tapped off the vehicle's regular braking system.

15. The vehicle lifting and parking aid of claim 9 wherein said braking system is connected to a touchdown wheel.

16. The vehicle lifting and parking aid of claim 1 wherein a solenoid-operated locking pin locks said sidewinder unit in said deployed position.

17. A vehicle lifting and parking aid comprising:
a plurality of sidewinder units, each said sidewinder unit secured to a vehicle to rotate about an axis of rotation of a wheel of said vehicle between a retracted position and a deployed position, said retracted position allowing normal operation of said vehicle wheel, said deployed position raising said wheel above a ground surface, each said sidewinder unit rotation controlled by a an operator of said vehicle, said deployed position providing controlled movement of said vehicle that is substantially perpendicular with respect to a longitudinal axis of said vehicle, whereby said wheels of said vehicle are raised above said ground surface without extending a suspension of said vehicle, each said sidewinder unit including a sidewinder wheel, said sidewinder wheel secured to said sidewinder unit to contact said ground surface while said sidewinder unit is in said deployed position, said sidewinder wheel having an axis of rotation, said axis of rotation being parallel said ground surface and parallel to said longitudinal axis of said vehicle, each said sidewinder unit including a touchdown wheel, said touchdown wheel positioned on said sidewinder to contact said ground surface before said sidewinder wheel, said touchdown wheel having an axis of rotation that is substantially perpendicular with respect to said sidewinder wheel and perpendicular with respect to said vehicles longitudinal axis.

18. The vehicle lifting and parking aid of claim 17 wherein each said touchdown wheel lifts said vehicle wheel approximately one half of one inch off the ground prior to allowing said sidewinder wheel to contact said ground surface.

19. The vehicle lifting and parking aid of claim 17 wherein one said sidewinder unit may be positioned at an angle which allows said vehicle to travel along its longitudinal centerline upon said touchdown wheel while the adjacently positioned wheel is raised above said ground surface.

20. The vehicle lifting and parking aid of claim 19 wherein said one sidewinder unit is electrically connected to a tire air pressure monitoring system, whereby said sidewinder unit is automatically deployed in response to a low pressure reading received from said tire air pressure monitoring system.

21. The vehicle lifting and parking aid of claim 20 wherein said tire air pressure monitoring system is electrically connected to an on board computer system for monitoring said tire air pressure, said sidewinder unit also being electrically connected to said on board computer, whereby said on board computer may automatically deploy said sidewinder unit.

* * * * *